Inventors.
Carl W. Claras.
Theodore Wickstrom
By. Zabel, Baker, York, Jones and Dithmar
Attorneys.

United States Patent Office 2,771,526
Patented Nov. 20, 1956

2,771,526

SWITCH ACTUATOR APPARATUS

Carl W. Claras and Theodore Wickstrom, Chicago, Ill., assignors to Revere Camera Company, Chicago, Ill., a corporation of Delaware Application September 1, 1954, Serial No. 453,599
5 Claims. (Cl. 200—61.62)

Figure 1:
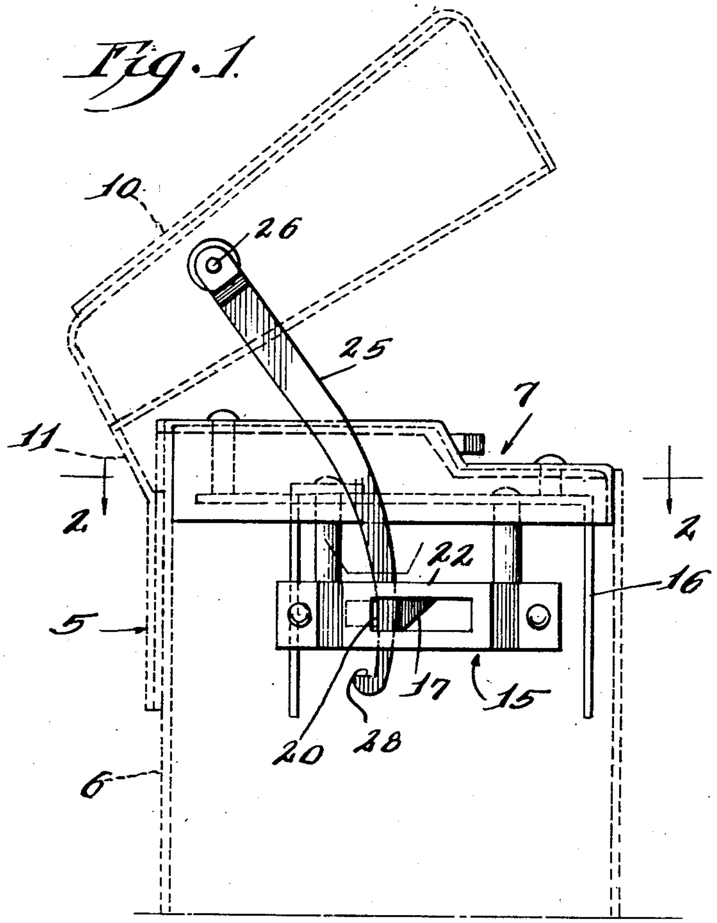

This invention relates to switch actuator apparatus particularly applicable to a switch which is opened and closed by the movement provided by opening and closing a hinged cover or the like.

In the form of the invention here illustrated, the switch is a component part of a portable radio receiver contained within a carrying case made of leather or other flexible sheet material. The operating panel of the radio receiver is at the top of the case, and a hinged cover is provided to enclose the panel when the receiver is not in use. The cover may be of the same sheet material as that used in the case.

The hinge between the case and cover may be described as a loose, flexible connection. It is such that when the cover is opened and closed there is random-direction movement between the cover and the case. It also is such that the relationship between the cover and the case is dimensionally irregular or unstable when the cover is both open and closed.

It is desirable in the case of a radio receiver or other electrical apparatus contained in a case as above described to have an "off-on" switch which is operated automatically by the movement or position of the cover. When the cover is closed the switch automatically should open, and when the cover is open the switch should be closed to energize the apparatus contained in the case.

One object of the invention, therefore, is to provide switch actuator apparatus operable by a hinged cover or the like which has random-direction movement with respect to a case and which has a relationship with the case that is dimensionally irregular and unstable. As will be understood, the random-direction movement and dimensional irregularity preclude the use of prior switch actuator apparatus which operate in response to fixed direction movement or dimensionally regular relationships.

In brief, the present switch actuator apparatus utilizes movement provided by a long, random-direction stroke to impart short, fixed-direction movement to a switch actuator, a wedge or cam element forming a part of the apparatus.

Other objects, advantages and details of the invention will be apparent as the description proceeds, reference being had to the accompanying drawing which illustrates one embodiment of the invention. It is to be understood, however, that the description and drawing are illustrative only, and that the scope of the invention is to be measured by the appended claims.

Figure 2:
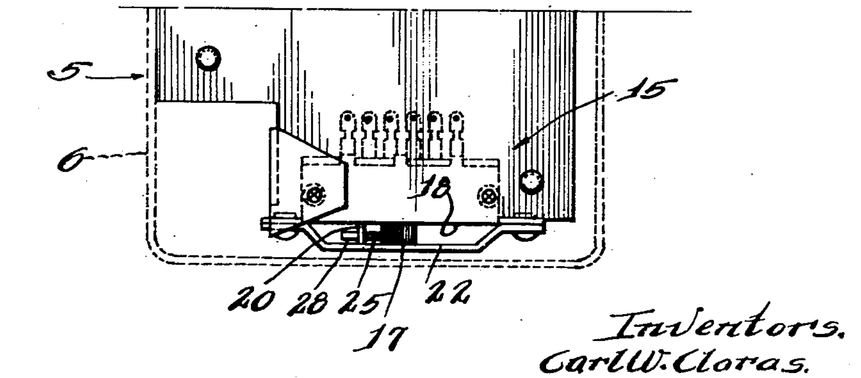

In the drawing:

Fig. 1 is a view in side elevation of a portable radio receiver embodying the invention, the case, hinge and cover of the receiver being shown in dotted lines so that the elements constituting the illustrated embodiment of the invention may be shown in full line, and Fig. 2 is a sectional view on line 2—2 of Fig. 1 showing further detail of the illustrated embodiment of the invention.

Referring to the drawing, the invention is shown embodied in a portable radio receiver 5. The receiver chassis etc. are contained in a case 6 made of any suitable material. The invention is most useful, perhaps, when the case exterior is made of a flexible sheet material such as leather. The top portion of case 6 houses operating panel 7 (Fig. 1) of the receiver.

The panel portion of case 6 is provided with a cover 10 which usually is made of the same material as used in case 6. Cover 10 is related to case 6 by means of a hinge 11 (Fig. 1), the hinge being of a more or less flexible type. In one form, hinge 11 may comprise a strip of flexible sheet material having its ends or sides connected respectively to case 6 and cover 10.

It will be understood that a loose, flexible hinge of the character illustrated and described provides random-direction movement and a dimensionally irregular or unstable relationship between cover 10 and case 6. With such a hinge it is not possible to use a switch actuator which depends for its operation on uniform-direction movement and/or a dimensionally regular and stable relationship between the cover and case.

A switch generally designated 15 is mounted within case 6, switch 15 being secured to a portion of receiver chassis 16 (Fig. 1). A switch actuator 17 extends laterally from a face 18 of the switch. Actuator 17 may be and usually is biased in one direction or the other, a suitable stop being provided to limit the movement of actuator 17 in the direction toward which the actuator is biased. When actuator 17 approaches or engages the stop the switch is in one switch position, for example "on," and when the actuator is moved against the bias a substantial distance from the stop the switch is in the other or "off" switch position.

A guide element 20, hereinafter sometimes called fixed element 20, is disposed in effective relation with actuator 17. Guide or fixed element 20 may comprise the aforesaid stop against which actuator 17 is urged by its bias means.

In the illustrated form of the invention a keeper 22 is provided in spaced relation with face 18 of the switch. Keeper 22 may take the form of a bracket element secured at its ends to switch 15.

In the broadest aspects of the invention neither keeper 22 nor the bias feature of actuator 17 is essential.

Switch 15 is opened and closed by means of a switch operator 25 which has one end attached as at 26 to a portion of cover 10 spaced from hinge 11. In most instances switch operator 25 is attached to cover 10 in a pivotal manner and it is curvilinear in shape, as shown in Fig. 1. Switch operator 25 is shaped and constructed to provide cam action as it moves back and forth, as will be seen.

When cover 10 is opened and closed switch operator 25 has a generally longitudinal movement, and it is guided in its movement by guide or fixed element 20. In the form of the invention shown, switch operator 25 extends between guide or fixed element 20 and biased switch actuator 17, the bias of actuator 17 being transmitted to switch operator 25 to hold the latter at all times against guide or fixed element 20. As best shown in Fig. 2, switch operator 25 extends through the space bounded by switch face 18, switch actuator 17, guide or fixed element 20, and keeper 22.

As here illustrated, switch operator 25 tapers in width from a wide dimension at the end adjacent cover 10 to a narrow dimension at the opposite end, the width dimension being the one extending between switch actuator 17 and guide or fixed element 20. It will be seen that when the cover is open, the narrow width dimension allows switch actuator 17 to most clearly approach fixed element 20 and thus place the switch in one operating condition, for example the "on" condition. When the cover is closed, a portion of switch operator 25 having a greater width dimension is disposed between switch actuator 17 and fixed element 20, thereby positioning switch actuator 17 in alternative or "off" switch condition.

The free end of switch operator 25 may be provided with a stop or hook element 28 which is effective to prevent switch operator 25 from becoming disassociated with respect to switch 15 in the event the cover is opened too far. Stop element 28 engages guide or fixed element 20 to limit the extent to which cover 10 may be opened.

Switch operator 25 also functions as a cover stay to hold cover 10 in open position. The bias of switch actuator 17 applied to operator 25 develops sufficient friction so that operator 25 functions as a stay to maintain cover 10 in any position to which it is opened.

From the above description it is thought that the construction and advantages of the invention will be readily apparent to those skilled in the art. Various changes in detail may be made without departing from the spirit or losing the advantages of the invention.

Having thus described the invention, what is claimed as new and desired to secure by Letters Patent is:

1. In combination, a case, a cover, a hinge between said case and said cover, said hinge providing random-direction movement and dimensionally irregular relation between said cover and said case, a switch mounted within said case, a switch actuator extending laterally from a face of said switch, a fixed element in close proximity to said actutor, said actuator being biased toward said fixed element, a keeper spaced from said switch face and an elongated combination cover stay and switch operator having one end attached to said cover in a pivotal manner, said stay and operator being curvilinear and tapering in width from said one end and having a stop element at the other end, said stay and operator extending through the space bounded by said switch face, said switch actuator, said fixed element and said keeper, whereby longitudinal movement of said stay and operator when said cover is opened and closed is effective, respectively, to close and open said switch.

2. In combination, a case, a cover, a hinge between said case and said cover, said hinge providing random-direction movement and dimensionally irregular relation between said cover and said case, a switch mounted within said case, a switch actuator extending laterally from a face of said switch, a fixed element in close proximity to said actuator, said actuator being biased toward said fixed element, a keeper spaced from said switch face and a combination cover stay and switch operator having one end attached to said cover, said stay and operator tapering in width from said one end and extending through the space bounded by said switch face, said switch actuator, said fixed element and said keeper, whereby longitudinal movement of said stay and operator when said cover is opened and closed is effective, respectively, to close and open said switch.

3. In combination, a case, a cover, a hinge between said case and said cover, said hinge providing random-direction movement and dimensionally irregular relation between said cover and said case, a switch mounted within said case, a switch actuator movable back and forth to open and close said switch, a fixed element in close proximity to said actuator, said actuator being biased toward said fixed element, and a combination cover stay and switch operator having one end attached to said cover, said stay and operator tapering in width from said one end and extending between said switch actuator and said fixed element, whereby longitudinal movement of said stay and operator when said cover is opened and closed is effective, respectively, to close and open said switch.

4. In combination, a case, a cover, a hinge between said case and said cover, said hinge providing random-direction movement and dimensionally irregular relation between said cover and said case a switch mounted within said case, a switch actuator movable back and forth to open and close said switch, a fixed element in close proximity to said actuator, said actuator being biased toward said fixed element, and a switch operator having one end attached to said cover and extending between said actuator and said fixed element, said switch operator providing cam action between said actuator and said fixed element whereby movement of said operator when said cover is opened and closed is effective, respectively to close and open said switch.

5. In combination, a case, a cover, a hinge between said case and said cover, said hinge providing random-direction movement and dimensionally irregular relation between said cover and said case, a switch mounted within said case, a switch actuator movable back and forth to open and close said switch, a guide element in close proximity to said actuator and a switch operator having one end attached to said cover and being guided by said guide element to travel back and forth in engagement with said switch actuator as said cover is opened and closed, said switch operator providing cam action on said switch actuator to close and open said switch.

References Cited in the file of this patent

UNITED STATES PATENTS

| | | |
|---|---|---|
| 1,535,922 | Larsen | Apr. 28, 1925 |
| 1,973,378 | Graesser | Sept. 11, 1934 |